F. W. WALQUIST.
OBSERVATION DEVICE.
APPLICATION FILED JULY 22, 1911.
1,042,730.
Patented Oct. 29, 1912.
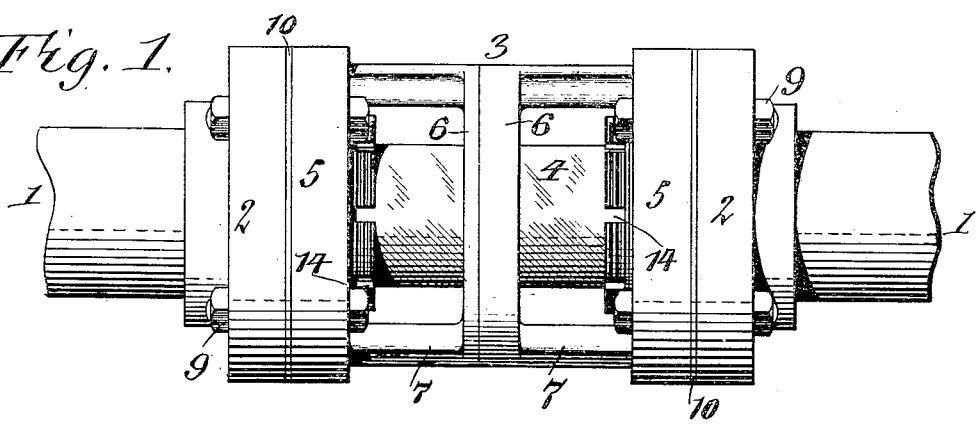
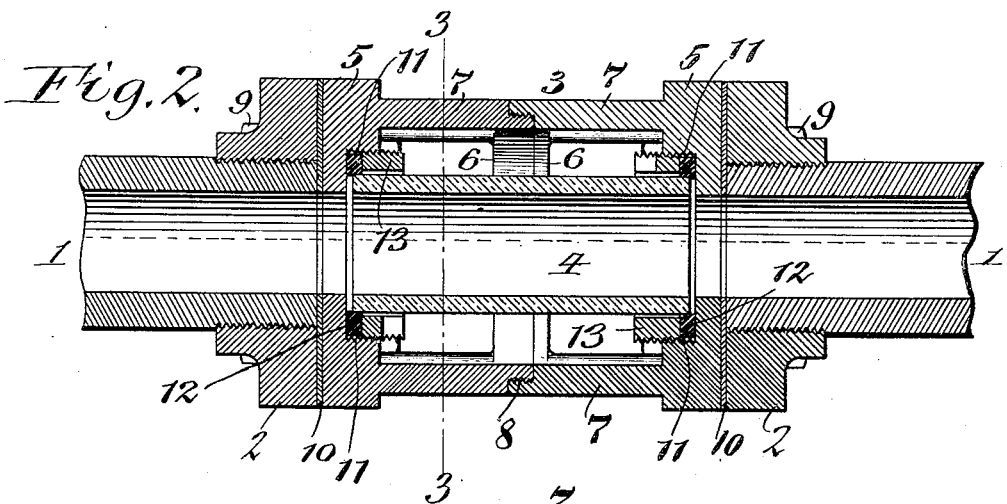
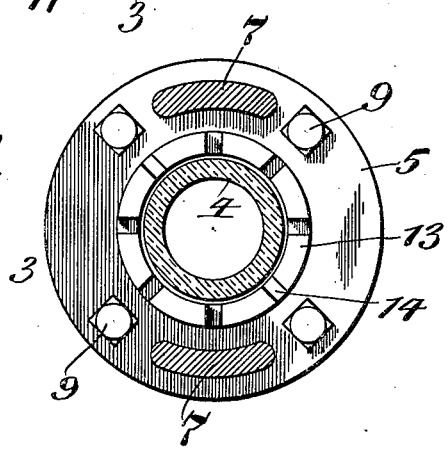
Witnesses:
Leroy S. Hodges
Richard Sommer
Inventor
Frank W. Walquist
by Geyer & Popp
Attorneys

UNITED STATES PATENT OFFICE.

FRANK W. WALQUIST, OF BUFFALO, NEW YORK, ASSIGNOR TO EDWARD ZAHM, OF BUFFALO, NEW YORK.

OBSERVATION DEVICE.

1,042,730.      Specification of Letters Patent.      Patented Oct. 29, 1912.

Application filed July 22, 1911. Serial No. 639,901.

*To all whom it may concern:*

Be it known that I, FRANK W. WALQUIST, a citizen of the United States, residing at Buffalo, in the county of Erie and State of New York, have invented new and useful Improvements in Observation Devices, of which the following is a specification.

This invention relates to an observation device or fitting which is intended to be placed in a line of piping or conduit for the purpose of permitting the passage of liquid, gas or other material through the piping to be observed.

It is the object of this invention to provide an observation fitting of this character which can be readily applied to or removed from the line of piping intended to receive the same without necessitating dismembering this piping, to so mount the cylindrical sight glass that the same forms practically a continuation or part of the line of piping, to provide means for packing and holding the sight glass that the same will not be subjected to any end pressure which would be liable to fracture the same, and to so construct the glass holder that the same affords the maximum protection for the glass against breakage but which permits of readily replacing the glass in case the same should be broken.

In the accompanying drawings: Figure 1 is a side elevation of my improved observation device or fitting arranged in a line of piping. Fig. 2 is a longitudinal section of the same. Fig. 3 is a cross section thereof, in line 3—3, Fig. 2.

Similar characters of reference indicate corresponding parts throughout the several views.

The piping with which my observation device or fitting is associated may be of any suitable construction and employed for conducting any suitable liquid, gas or other material and particularly material which is under pressure. As shown in the drawings, this piping comprises two pipe or conduit sections 1, 1 which are arranged axially in line and provided on their opposing ends which are spaced apart with annular flanges 2, 2. These flanges may be secured to these pipe sections in any suitable manner, for instance, by means of a screw joint, as shown in Fig. 2.

My improved observation device or fitting is placed into the space between the opposing ends of the pipe sections and comprises a metal frame 3 and a cylindrical sight glass 4 which is mounted in the frame or holder axially in line with the pipe sections.

In its general organization the frame or holder of the observation fitting comprises two sections each of which has an outer supporting or coupling ring 5, an inner supporting or coupling ring 6 spaced a suitable distance apart from the outer coupling ring and arranged axially in line therewith and a plurality of longitudinal connecting bars 7 each of which is connected at its inner and outer ends with the inner and outer coupling rings respectively. The inner and outer coupling rings and the connecting bars of each holder section are preferably cast in one piece, as shown in the drawings. The inner coupling rings of both holder sections are detachably connected with each other which connection may be effected by any suitable means but preferably by means of a screw joint 8, as shown in Fig. 2. The outer coupling rings of the holder are connected with the flanges of the pipe sections, respectively, this connection being preferably effected by means of bolts 9, as shown in the drawings, although any other suitable means may be employed for this purpose.

In order to secure a tight joint between each outer coupling ring and pipe flange, if this should be necessary, a packing ring or gasket 10 is interposed between these parts, as shown in Figs. 1 and 2.

The bore of the outer coupling rings of the holder is the same or substantially the same as that of the pipe sections so as to practically form continuations of these pipes but the bore of the inner coupling rings is considerably greater than that of the outer coupling rings and the diameter of the periphery of the sight glass so as to form a clearance space between the inner sides of these rings and the connecting bars and the periphery of the sight glass which is arranged within the frame. The sight glass is arranged axially in line with the pipe sections and outer coupling ring and its bore is of the same diameter, or substantially so, as that of the pipe section and outer coupling rings, so that this glass practically forms a continuation of the pipe system and therefore does not interfere with the free flow of the liquid, gas or other material through the same, thereby avoiding all liability of material lodging in the piping at the observation fitting which otherwise would necessitate occasional dismembering of the parts for cleaning.

At its opposite ends the sight glass projects into annular rabbets, seats or recesses 11 formed on the opposing inner sides of the outer coupling rings. The glass is held at opposite ends in the recesses of these outer rings and securely packed against leakage by means which are preferably constructed as follows: 12, 12 represent two annular packings or rings of any suitable flexible or fibrous material each of which bears at its bore and periphery against the periphery of the sight glass at one end thereof and the bore of one of the rabbets while its inner flat end bears against the bottom of the respective rabbet. 13, 13 represent two screw glands of annular or ring-shaped form each of which surrounds the cylindrical sight glass at one end thereof and is provided externally with a screw thread which engages with an internal screw thread formed in the bore of one of the rabbets. Upon tightening each of these glands the same bears against one of the packing rings whereby the latter is pressed with its outer end against the bottom of the respective rabbet and also caused to spread outwardly against the bore of the rabbet and inwardly against the periphery of the sight glass, thereby producing a tight joint between the sight glass and the holder for preventing leakage at this place from the conduit.

The diameter of the bore of each gland is larger than that of the periphery of the sight glass so that the latter is out of contact from the gland. The sight glass is free from any end pressure and only subjected to inward pressure of the packing ring inasmuch as the sight glass, owing to its cylindrical construction, is capable of withstanding considerable inward pressure. It is therefore possible to produce a perfectly tight joint between the glass and its holder without liability of fracturing the glass as would be the case if this packing exerted endwise pressure against the sight glass.

The turning of the glands may be effected in various ways but preferably by means of a spanner wrench constructed to engage with notches 14 formed in the edges of the glands.

If for any reason the sight glass should become broken the same can be easily renewed by first removing the holder laterally from between the flanges of the pipe sections and then disconnecting the two sections of the holder, these parts being reassembled reversely to the order just described after a new sight glass has been put in place.

This observation fitting is exceedingly simple in construction and as it is well protected the same is not liable to get out of order. Furthermore, the construction as a whole is very compact and does not occupy more space than an ordinary pipe coupling, thereby rendering the same particularly desirable for use in close quarters.

I claim as my invention:

1. An observation device comprising a holder having two sections each of which has inner and outer rings and longitudinal bars connecting said inner and outer rings, said inner rings being connected and each of the outer rings being provided on its inner side with an annular rabbet, a cylindrical sight glass arranged at its opposite ends in said rabbets, packing rings surrounding said glass within said rabbets, and annular glands each engaging one of said packing rings and connected with the adjacent outer ring.

2. An observation device comprising a holder having two sections each of which has inner and outer rings and longitudinal bars connecting said inner and outer rings, said inner rings being connected by a screw joint and each of the outer rings being provided on its inner side with an annular rabbet the bore of which is screw threaded, a cylindrical sight glass arranged at its opposite ends in said rabbets, packing rings surrounding said glass within said rabbets, and annular glands each engaging one of said packing rings and connected with the adjacent outer ring.

Witness my hand this 18th day of July, 1911.

FRANK W. WALQUIST.

Witnesses:
CHARLES A. NAGEL,
ELEANOR STURTZER.